United States Patent [19]

Kretschmer et al.

[11] Patent Number: 4,501,156
[45] Date of Patent: Feb. 26, 1985

[54] METHOD OF AND DEVICE FOR MEASURING A MASS STREAM OF FINELY DIVIDED FINE-GRAINED SOLID FUELS

[75] Inventors: Horst Kretschmer; Günter Tietze, both of Freiberg; Norbert Beiermann, Brand-Erbisdorf; Manfred Schingnitz; Peter Goehler, both of Freiberg, all of German Democratic Rep.

[73] Assignee: Brennstoffinstitut Freiberg, Freiberg, German Democratic Rep.

[21] Appl. No.: 399,988

[22] Filed: Jul. 19, 1982

[30] Foreign Application Priority Data

Jul. 17, 1981 [DD] German Democratic Rep. ... 231890

[51] Int. Cl.³ .................................................. G01F 1/74
[52] U.S. Cl. .................................................. 73/861.04
[58] Field of Search ............... 73/861.04, 861.07, 861; 250/356.1

[56] References Cited

U.S. PATENT DOCUMENTS 4,182,957 1/1980 Forster et al. .................. 250/356.1
4,270,558 6/1981 Forster et al. ............... 73/861.04 X

FOREIGN PATENT DOCUMENTS 2554565 6/1977 Fed. Rep. of Germany .
2757032 6/1978 Fed. Rep. of Germany .
2902911 7/1980 Fed. Rep. of Germany .
142606 7/1980 German Democratic Rep. .
145958 1/1981 German Democratic Rep. .
199246 9/1981 German Democratic Rep. .

Primary Examiner—Herbert Goldstein
Assistant Examiner—Brian R. Tumm
Attorney, Agent, or Firm—Michael J. Striker

[57] ABSTRACT

A mass stream of a dusty solid fuel is conveyed pneumatically through a supply pipe leading from a dosing container to a gasification reactor. A gas admixing device is connected in series with the supply pipe near the outlet of the container for injecting an auxiliary gas into the mass stream. The parameters of the mass stream are measured before and after the mixing device and applied to a computer which determines the amount of the injected gas and the value of the mass stream. In this manner, the arrangement for measuring the gas stream can operate continuously and independently from the technology of feeding the dust to the supply pipe and provides quantitatively correct measuring values at all dust concentrations and system pressures. The method eliminates complicated velocity measurements in two-phase dust streams and does not necessitate any measuring probes which project into the conveying channel and obstruct the flow.

2 Claims, 2 Drawing Figures

METHOD OF AND DEVICE FOR MEASURING A MASS STREAM OF FINELY DIVIDED FINE-GRAINED SOLID FUELS

BACKGROUND OF THE INVENTION

This invention relates in general to the measurement of mass streams of fine-grained dusty solid fuels conveyed pneumatically to a gasification reactor or burner.

Known are methods and arrangements for determining the mass stream for dusty and fine-grained materials which either transmit qualitative measuring signals without indication of exact quantitative measuring values or which are suitable for pneumatic transportation of mass streams having an extremely low density of solid particles ($\rho_{f2}$ less than 30 kg/m$^3$).

From DD Pat. Nos. 199 246 and 145 958 measuring methods of the above described are known which deliver analog values of the mass streams. Such analog signals can be employed for an exactly defined density condition and are reproducible for a definite quality of the dusty fuel and possess sufficient accuracy for technical applications. These analog methods, however, require recalibration when the quality of conveyed dust fuel changes. From DD Pat. No. 142 606 an optical measuring process is known which has the capacity of simultaneously producing multiple measuring values. Nevertheless, due to the lack of transparency and light-reflecting qualities of coal dust, this prior-art method is not suitable in two-phase mass streams. From German Pat. Nos. 2,554,565, 2,902,911 and 2,757,032, measuring methods are known which result in only approximate measuring values because they do not consider the actual condition of the dust-gas mixture flowing in the measuring path. Consequently, these methods are inapplicable for streams with high loads of solid particles ($\rho_{f2}$ larger than or equal to 50 kilograms per cubic meter).

SUMMARY OF THE INVENTION

It is an object of the invention to provide a novel measuring method which is not possessed with the above mentioned disadvantages.

It is a further object to provide a continuously operating measuring arrangement which independently from the technological design of the dust feeding to the supply pipe produces quantitatively correct measuring values at all concentrations of the dust and at all system pressures which are technologically realizable.

Another object of the present invention is to provide an improved measuring method which eliminates the complicated velocity measurements in two-phase streams.

Still another object of this invention is to avoid restrictions or enlargements of the diameter of the supply pipe, thus assuring the uniformity and continuity of flow.

Still a further object of this invention is to avoid recalibration of the measuring path upon the change of the dust quality so that the device operates independently from the dust variations.

In keeping with these objects, and others which will become apparent, the invention comprises the steps of measuring at the outlet of the dosing container or a storage bin the initial density $\rho_{f1}$ of the conveyed stream of dust which varies in dependence on the necessary technological measures and on the flow qualities of the conveyed material, then passing the conveyed stream through a mixing device in which a gas stream is admixed without shocks to the dust stream so as to reduce the density of the latter. This reduced density $\rho_{f2}$ and the rate of the injected gas $V_{G(N)}$ as referred to a standard condition of the gas is also measured by means of a density measuring probe or by a measuring diaphragm arranged downstream of the mixing device. The gas-mixing apparatus operating without shocks is constituted by a porous, gas-permeable and dust-blocking filtering pipe having the same flow cross section as the mass stream supply pipe and having a length which disperses the applied stream of the injection gas.

On the basis of measured values $V_{G(N)}$, $\rho_{f1}$, and $\rho_{f2}$, and considering the rate of flow $m_{G1}$ in the dust stream at the beginning of the measuring path, and the total velocity of gas $m_{G2}$ in the dust stream at the end of the measuring path, the mass stream is determined according to the following equation:

$$\dot{m}_K + \dot{m}_{G1} + \dot{V}_{G(N)} \cdot \rho_{G(N)} = \dot{m}_K + \dot{m}_{G2}$$

With known values of dust grain density $\rho_K$ and standard density of the gas $\rho_{G(N)}$ namely the density of both the injection gas and the conveying or carrier gas at normal conditions, and by means of the measurement of the temperatures $T_1$ and $T_2$ and pressures $P_1$ and $P_2$ before and after the mixing device, and upon computation of the gas densities and volumes in operational conditions, the mass stream $\dot{m}_K$ is determined according to the following equations $$\dot{m}_K = \dot{V}_{G(2)} \cdot \frac{\rho_K(\rho_{f1} - \rho_{G1}) \cdot (\rho_{f2} - \rho_{G2})}{(\rho_K - \rho_{G1}) \cdot (\rho_{f1} - \rho_{f2})} \cdot \quad (2)$$

$$\left[1 + \left(\frac{P_1}{P_2} - 1\right) \cdot \left(\frac{\rho_K - \rho_{f1}}{\rho_K - \rho_{G1}}\right)\right]^{-1}$$

$$\rho_{G1} = \rho_{G(N)} \cdot \frac{P_1}{P_N} \cdot \frac{T_N}{T_1} \quad (2.1)$$

$$\rho_{G2} = \rho_{G(N)} \cdot \frac{P_2}{P_N} \cdot \frac{T_N}{T_2} \quad (2.2)$$

$$\dot{V}_{G(2)} = \dot{V}_{G(N)} \cdot \frac{T_2}{T_N} \cdot \frac{P_N}{P_2} \quad (2.3)$$

wherein $P_N$ and $T_N$ denote pressure and temperature at normal conditions, respectively; $\rho_{G1}$ is the density of conveying (carrier) gas at a pressure $P_1$ and temperature $T_1$ before the mixing apparatus; and $\rho_{G2}$ is the density of combined gas (i.e. conveying gas plus injection gas) at a pressure $P_2$ and temperature $T_2$ after the mixing apparatus.

At higher system pressures and higher concentrations of the solid particles in regions of dense streams, it is sufficient to make simple temperature and pressure measurements, that is, if the heat capacity of solid material outbalances that of the gas provided that the temperatures of the solid material and the gas differ from each other, the expansion effects can be disregarded, and consequently the following relations can be set:

$$P_1 = P_2, \; T_1 = T_2, \; \rho_{G1} = \rho_{G2}.$$

Consequently, the following simplified equations are valid for the mass stream $\dot{m}_K$:

$$\dot{m}_K = \dot{V}_{G(2)} \cdot \frac{\rho_K \cdot (\rho_{f1} - \rho_{G2}) \cdot (\rho_{f2} - \rho_{G2})}{(\rho_K - \rho_{G2}) \cdot (\rho_{f1} - \rho_{f2})} \quad (3)$$

$$\rho_{G2} = \rho_{G(N)} \cdot \frac{P_2}{P_N} \cdot \frac{T_N}{T_2} \quad (3.1)$$

$$\dot{V}_{G(2)} = \dot{V}_{G(N)} \cdot \frac{P_N}{P_2} \cdot \frac{T_2}{T_N} \quad (3.2)$$

The above equations are computed continuously according to the input of the ascertained measuring values (T, p, $V_{G(N)}$, $\rho_{f1}$ and $\rho_{f2}$) and according to fixed values ($\rho_K$ and $\rho_{G(N)}$) by means of a microprocessor or computer during the conveying operation.

In order to achieve high accuracy in measuring the mass stream $\dot{m}_K$, the amount of injection gas $V_{G(N)}$ which depends on the value of the system pressure p and of the mass stream, must be selected such that for values up to $\rho_{f2}$ 0.6 $\rho_s$ ($\rho_s$ is charging or bulk density of the dusty material), a jump in density of $\rho_{f1} - \rho_{f2}$ which equals approximately 100 kg/m³, is achieved.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
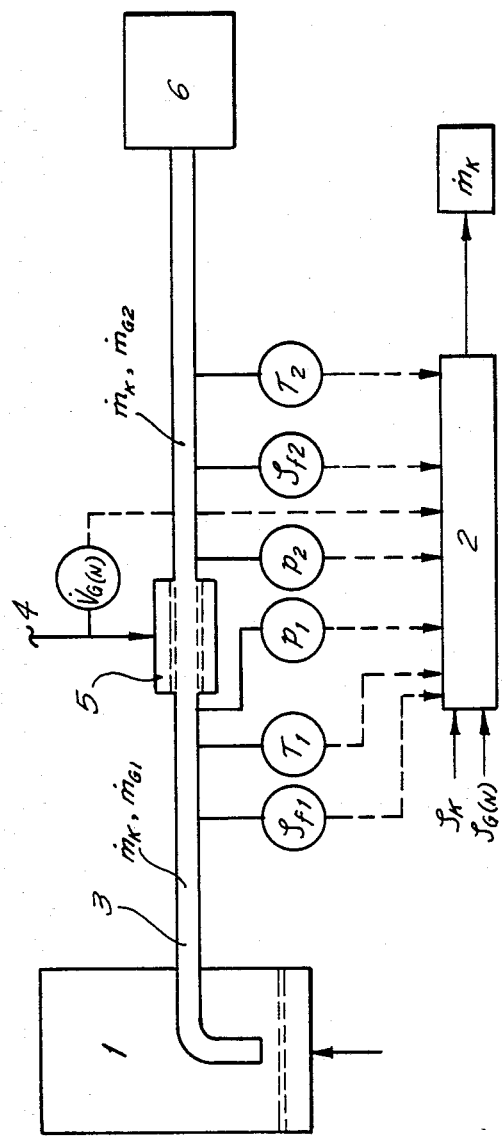
FIG. 1 is a simplified block diagram of an arrangement for measuring mass stream conveyed from a dosing container at increased system pressures.

Referring firstly to FIG. 1, coal dust of grain density $\rho_K = 1{,}400$ kg/m³ is conveyed pneumatically by means of nitrogen of standard density $\rho_{G(N)} = 1.25$ kg/m³ from a dosing container 1 at an operational pressure $p_1 = 3.0$ Mpa (Mpa=Megapascal=1 bar≈1 atm) through a supply pipe 3 to a gasification reactor or heater 6. In order to determine the mass stream $\dot{m}_K$, there is provided a mixing device 5 in the supply pipe 3 through which an injection gas 4 is supplied at a rate of $\dot{V}_{G(N)} = 250$ m³/hour into the dust stream. Flow densities before and after the mixing device 5 are measured radiometrically and have for example values of $\rho_{f1} = 380$ kg/m³ and $\rho_{f2} = 280$ kg/m³. Temperatures before and after the mixing device are approximately the same and have a value $T_1 = T_2 = 353°$ K. From the aforementioned equations (2), (2.1), (2.2) and (2.3), a microprocessor or computer 2 determines a value of the mass stream to be 10 tons/hour. The mixing device 5 is constituted by a porous tubular piece having substantially the same inner diameter as the supply pipe 3 (40 mm) and the length of the porous filtering pipe which is impermeable to dust, amounts to L=500 mm at the flow speed of 5 cm/sec. The measured flow density $\rho_{f1}$ (or $\rho_{f2}$) is defined as combined mass of solid grains plus gas in a certain volume of the solid grain/gas mixture. Since temperature and pressure values before and after the mixing apparatus, as well as the density values of the injection and conveying gases are known, the mass stream $\dot{m}_K$ can be determined from the equations 2, 2.1, 2.2 and 2.3.

Figure 2:
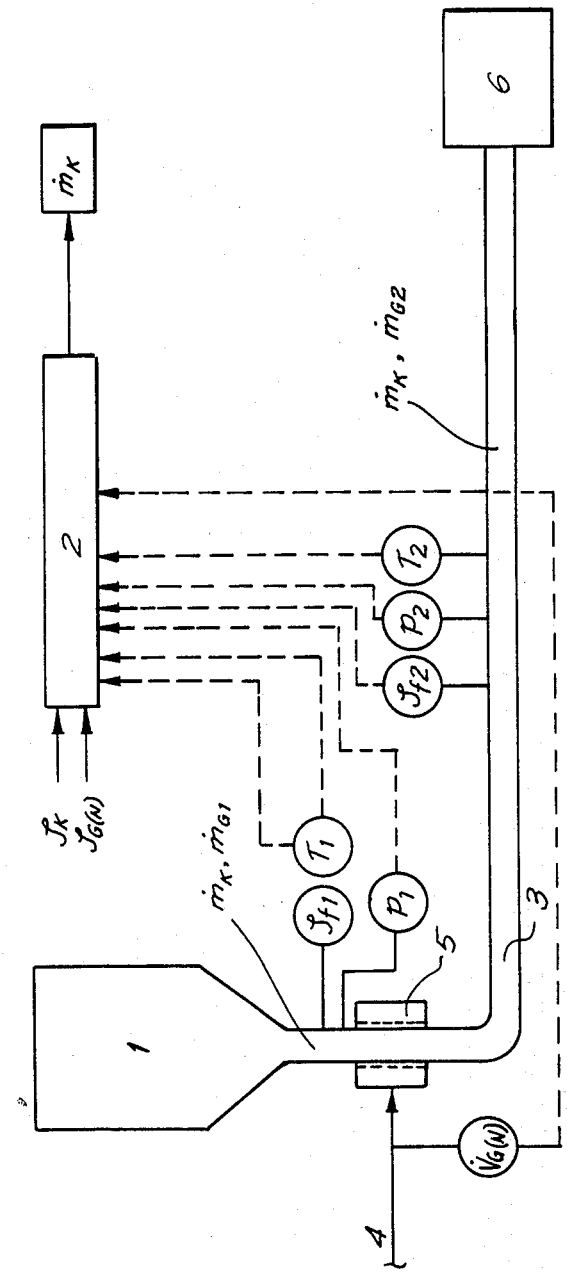
FIG. 2 is a simplified block diagram of an arrangement for measuring the mass stream from a bin.

In the example according to FIG. 2 there is pneumatically conveyed at an overpressure of $p_1 = 0.15$ Mpa coal dust having a grain density $\rho_K = 1{,}400$ kg/m³, from a bin 1 at an initial flow density $\rho_{f1} = 470$ kg/m³ through a supply pipe 3. The carrier gas is air of a standard density $\rho_{G(N)} = 1.293$ kg/m³. Immediately at the outlet from the bin the mass stream passes through the mixing device 5 in which injection gas from conduit 4 is admixed into the gas stream. The rate of the injection gas $\dot{V}_{G(N)} = 29$ m³/hour, so that flow density $\rho_{f2}$ of the mass streams drops to 280 kg/m³ and pressure at the measuring point after the mixing device is $p_2 = 0.1$ Mpa. The temperature before and after the mixing device is the same and equals $T_1 = T_2 = 313°$ K.

The microprocessor 2 computes from the applied measuring values from equations (2), (2.1), (2.2) and (2.3) a mass stream $\dot{m}_K = 10$ tons/hour. The length of the porous filtering pipe in the mixing device 5 is about 750 mm at the flow rate of the stream of 5 cm/hour and the diameter of the pipe is 40 mm. The porous filtering pipe is made preferably of a sintered metal or of grits bonded by synthetic resin. In both examples, standard density $\rho_{G(N)}$ and composition of the injection gas $V_{G(N)}$ are the same as those of the conveying (carrier) gas.

It will be understood that each of the elements described above, or two or more together, may also find a useful application in other types of constructions differing from the types described above.

While the invention has been illustrated and described as embodied in specific examples of the measuring arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of measuring a mass stream of a finely divided, fine-grained solid material conveyed pneumatically by a conveying gas through a supply pipe leading from a dosing container to a gasification reactor or a heater, comprising the steps of passing the mass stream in the supply pipe through a gas mixing device including a porous filtering pipe permeable to gas and impermeable to the dusty fuel, injecting an auxiliary gas through the filtering pipe into the supply pipe at a rate sufficient to reduce the flow density of the mass stream, measuring grain density $\rho_k$, gas density $\rho_{G(N)}$ at normal conditions, temperature $T_1$, pressure $P_1$, initial flow density $\rho_{f1}$ of the mass stream before the mixing device, flow density $\rho_{f2}$ of the mass stream after the mixing device, temperature $T_2$ and pressure $P_2$, after the mixing device; applying the measured parameters to a computer for computing the desired value $\dot{m}_K$ of the mass stream per a time unit according to the formulas $$\dot{m}_K = \dot{V}_{G(2)} \cdot \frac{\rho_K(\rho_{f1} - \rho_{G1}) \cdot (\rho_{f2} - \rho_{G2})}{(\rho_K - \rho_{G1}) \cdot (\rho_{f1} - \rho_{f2})} \quad (2)$$

-continued $$\rho_{G1} = \rho_{G(N)} \cdot \frac{P_1}{P_N} \cdot \frac{T_N}{T_1} \quad (2.1)$$

$$\rho_{G2} = \rho_{G(N)} \cdot \frac{P_2}{P_N} \cdot \frac{T_N}{T_2} \quad (2.2)$$

$$\dot{V}_{G(2)} = \dot{V}_{G(N)} \frac{T_2}{T_N} \cdot \frac{P_N}{P_2} \quad (2.3)$$

wherein $\rho_{G1}$ is the density of the conveying gas, $\rho_{G2}$ is the density of the combined conveying and auxiliary gases after the mixing device, and $\dot{V}_{G(2)}$ is the rate of flow of the injected gas.

2. A method as defined in claim 1, wherein the flow density after the mixing device is larger than 160 kg/m³ and/or the operational pressure after the mixing device is larger than 0.6 Mpa, the following equations being employed for determination of the mass stream:

$$\dot{m}_K = \dot{V}_{G(2)} \cdot \frac{\rho_K \cdot (\rho_{f1} - \rho_{G2}) - (\rho_{f2} - \rho_{G2})}{(\rho_K - \rho_{G2})(\rho_{f1} - \rho_{f2})} \quad (3)$$

$$\rho_{G2} = \rho_{G(N)} \cdot \frac{P_2}{P_N} \cdot \frac{T_N}{T_2} \quad (3.1)$$

$$\dot{V}_{G(2)} = \dot{V}_{G(N)} \cdot \frac{P_N}{P_2} \cdot \frac{T_2}{T_N} \quad (3.2)$$

wherein the parameters $T_2$, $P_2$, $\rho_{G2}$ are measured after the mixing device and applied to the computer.

* * * * *